United States Patent
Chambliss et al.

(10) Patent No.: US 7,520,347 B2
(45) Date of Patent: Apr. 21, 2009

(54) STAIR CHAIR WITH AN ADJUSTABLE GLIDE TRACK RESISTANCE AND BRAKING DEVICE

(75) Inventors: Charles Scott Chambliss, New Vienna, OH (US); Timothy J. Dietz, Springboro, OH (US); Steven B. Schrand, Cincinnati, OH (US)

(73) Assignee: Ferno-Washington, Inc., Wilmington, OH (US)

( * ) Notice: Subject to any disclaimer, the term of this patent is extended or adjusted under 35 U.S.C. 154(b) by 281 days.

(21) Appl. No.: 11/462,064

(22) Filed: Aug. 3, 2006

(65) Prior Publication Data

US 2007/0095581 A1 May 3, 2007

Related U.S. Application Data

(60) Provisional application No. 60/707,426, filed on Aug. 11, 2005.

(51) Int. Cl.
*B62D 5/06* (2006.01)
(52) U.S. Cl. ........................ 180/8.2; 280/5.22
(58) Field of Classification Search ............... 180/8.2; 280/5.22, 5.2, DIG. 10
See application file for complete search history.

(56) References Cited

U.S. PATENT DOCUMENTS

| | | |
|---|---|---|
| 1,206,936 A | 12/1916 | Staude |
| 2,193,283 A | 3/1940 | Harberson |
| 3,111,331 A | 11/1963 | Locke |
| 3,127,188 A | 3/1964 | Greub |
| 3,133,742 A | 5/1964 | Richison et al. |
| 3,137,511 A | 6/1964 | Weil et al. |
| 3,146,841 A | 9/1964 | Locke |
| 3,191,953 A | 6/1965 | Aysta |
| 3,195,910 A | 7/1965 | Steiner |
| 3,279,531 A | 10/1966 | Bowles |
| 3,288,234 A | 11/1966 | Feliz |
| 3,292,722 A | 12/1966 | Bamberg |
| 3,420,540 A | 1/1969 | Bird |
| 3,529,688 A | 9/1970 | Bruce |
| 4,061,199 A | 12/1977 | Last |
| 4,401,178 A | 8/1983 | Studer |

(Continued)

FOREIGN PATENT DOCUMENTS

CH 666007 A5 6/1988

OTHER PUBLICATIONS

Hayes El Comino, Hydraulic Disc Brake, Installation, Service, Maintenance Manual, 45-17692Web.

*Primary Examiner*—Tony H. Winner
(74) *Attorney, Agent, or Firm*—Dinsmore & Shohl LLP

(57) ABSTRACT

A stair chair for transporting a person up and down a flight of stairs and over a surface is disclosed. The stair chair comprising a main frame and a glide track assembly to support the stair chair for movement on the flight of stairs. The glide track assembly is pivotally connected to the main frame for pivotal movement between open and closed positions. The glide track assembly has at least one endless glide track. The stair chair also provides an adjustable glide track resistance and braking device which engages the endless glide track and is configured to infinitely adjust the amount of resistance applied to the endless glide track between 0 to 100% resistance and to set a desired rolling resistance applied to the endless glide track.

25 Claims, 6 Drawing Sheets

U.S. PATENT DOCUMENTS

| | | |
|---|---|---|
| 4,432,426 A | 2/1984 | Misawa |
| 4,473,234 A | 9/1984 | Egen |
| 4,556,229 A | 12/1985 | Bihler et al. |
| 4,566,550 A | 1/1986 | Misawa |
| 4,566,706 A | 1/1986 | Bihler et al. |
| 4,585,241 A | 4/1986 | Misawa et al. |
| 4,627,508 A | 12/1986 | Auer |
| 4,688,813 A | 8/1987 | Misawa et al. |
| 4,771,839 A | 9/1988 | Misawa |
| 4,962,941 A | 10/1990 | Rembos |
| 5,042,827 A | 8/1991 | Mortenson |
| 5,197,558 A | 3/1993 | Misawa |
| 5,338,048 A | 8/1994 | Medina |
| 5,797,606 A | 8/1998 | Misawa |
| 5,868,403 A | 2/1999 | Culp et al. |
| 6,435,538 B2 | 8/2002 | Ellis et al. |
| 6,561,524 B1 | 5/2003 | Medina |
| 6,648,343 B2 | 11/2003 | Way et al. |
| 6,938,740 B2 | 9/2005 | Gandy |
| D519,064 S | 4/2006 | Schrand et al. |
| 7,124,454 B2 | 10/2006 | Walkingshaw |

STAIR CHAIR WITH AN ADJUSTABLE GLIDE TRACK RESISTANCE AND BRAKING DEVICE

CROSS REFERENCE TO RELATED APPLICATION

The present application claims priority to U.S. Provisional Patent Application No. 60/707,426, filed Aug. 11, 2005.

BACKGROUND OF THE INVENTION

This invention generally relates to medical transport devices, and in particular to a stair chair with an adjustable glide track resistance and braking device.

Various types of stair chairs are specifically designed to transport people down stairs are known. In particular, it is known to attach a pair of foldable glide tracks each having an endless tread carried by a plurality of rollers to the back of a stair chair, which are used in a deployed position to transport a person down a flight of stairs. In the deployed position, the treads grip the stairs and prevent the stair chair from sliding out of control. Difficulty may be encountered, however, in providing a ride having a consistent, manageable rate of descent supporting people of various weights.

SUMMARY OF THE INVENTION

The invention provides a chair that can readily be used both to transport people upstairs and downstairs. The present invention provides to a stair chair an adjustable glide track resistance and braking device. The adjustable glide track resistance and braking device enables an operator to quickly and easily adjust the rolling resistance of the glide track. As such, for people of various weights, the operator is able to vary the rolling resistance on the fly such that a more consistent and manageable rate of descent is provided when supporting a patient on the stair chair. In one embodiment, the present invention is provided as a collapsible stair chair.

In accordance with one embodiment of the invention, a stair chair for transporting a person up and down a flight of stairs and over a ground surface is disclosed. The stair chair comprising a main frame and a glide track assembly to support the stair chair for movement on the stairs. The glide track assembly is pivotally connected to the main frame for pivotal movement between open and closed positions. The glide track assembly has at least one endless glide track. The stair chair also provides an adjustable glide track resistance and braking device which engages the endless glide track and is configured to infinitely adjust the amount of resistance applied to the endless glide track between 0 to 100% resistance and to set a desired rolling resistance applied to the endless glide track.

Further benefits and advantages of the invention will become apparent from a consideration of the following detailed description, given with reference to the accompanying drawings, which specify and show preferred embodiments of the invention.

DETAILED DESCRIPTION

Figure 2:
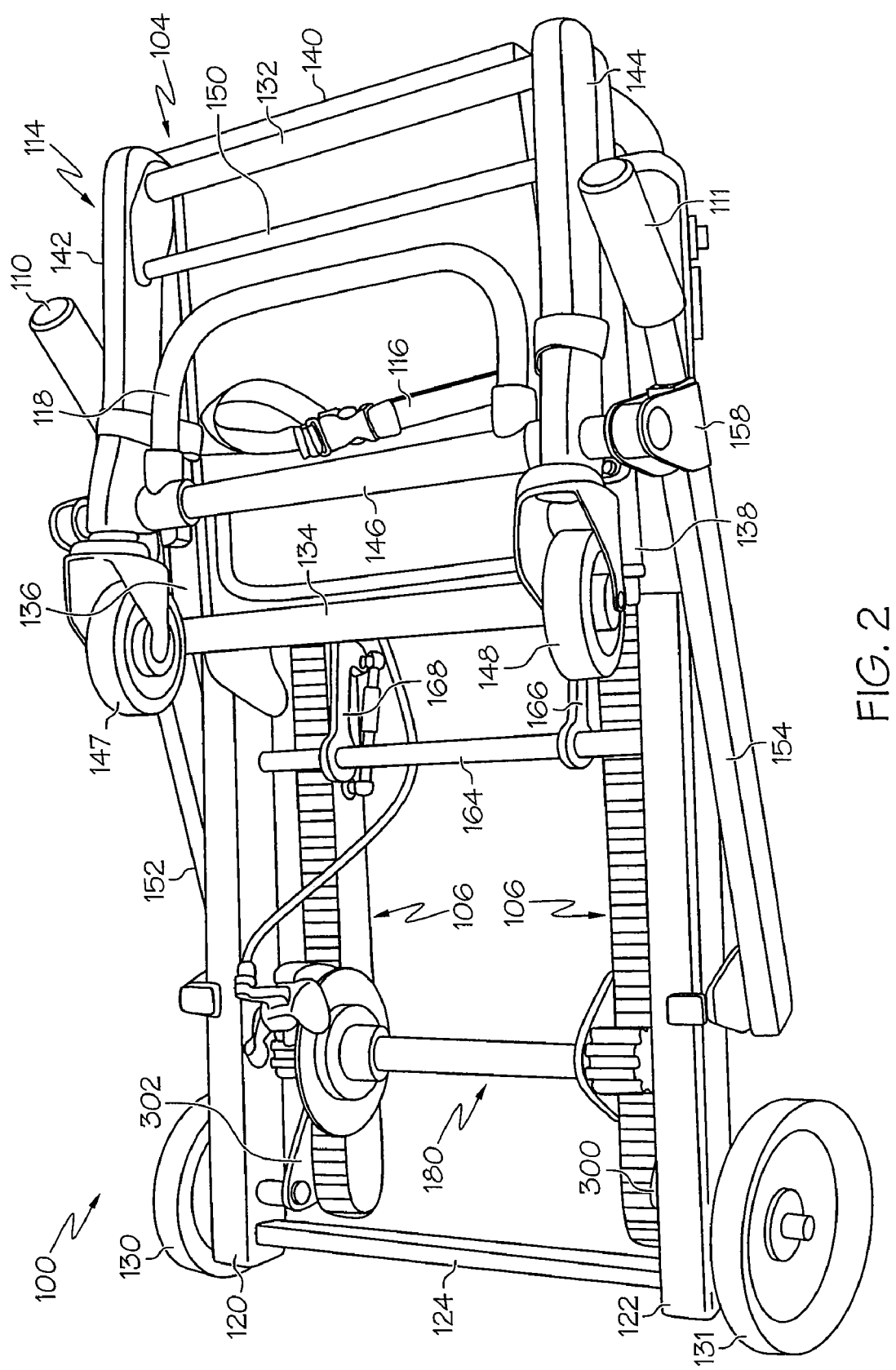
FIG. 2 shows the stair chair of FIG. 1 in its collapsed position.
Figure 3:
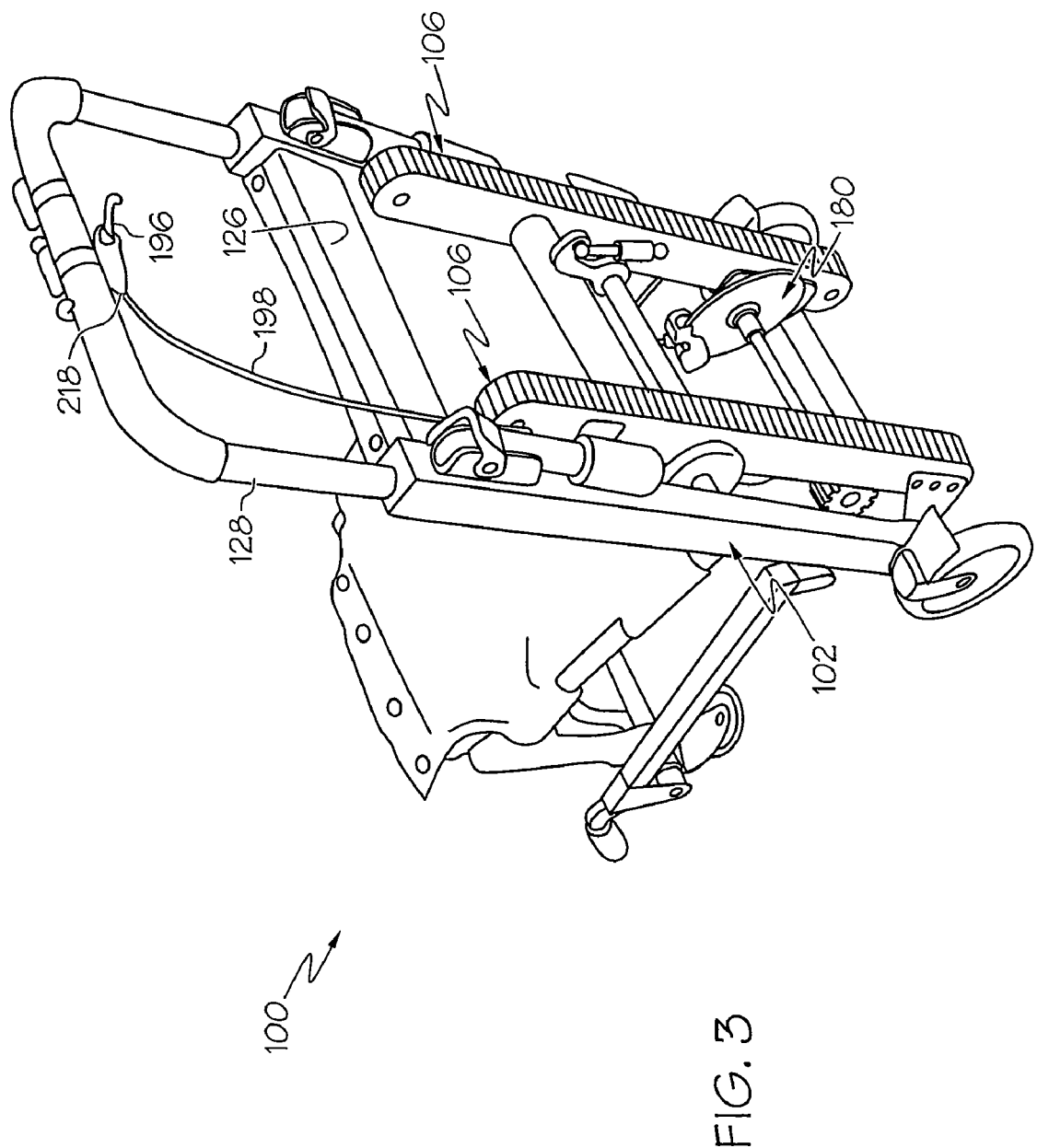
FIG. 3 is a rearward, elevated perspective view of one embodiment of a stair chair with a glide track assembly in a folded or closed position with an adjustable glide track resistance and braking device according to the present invention.
Figure 4:
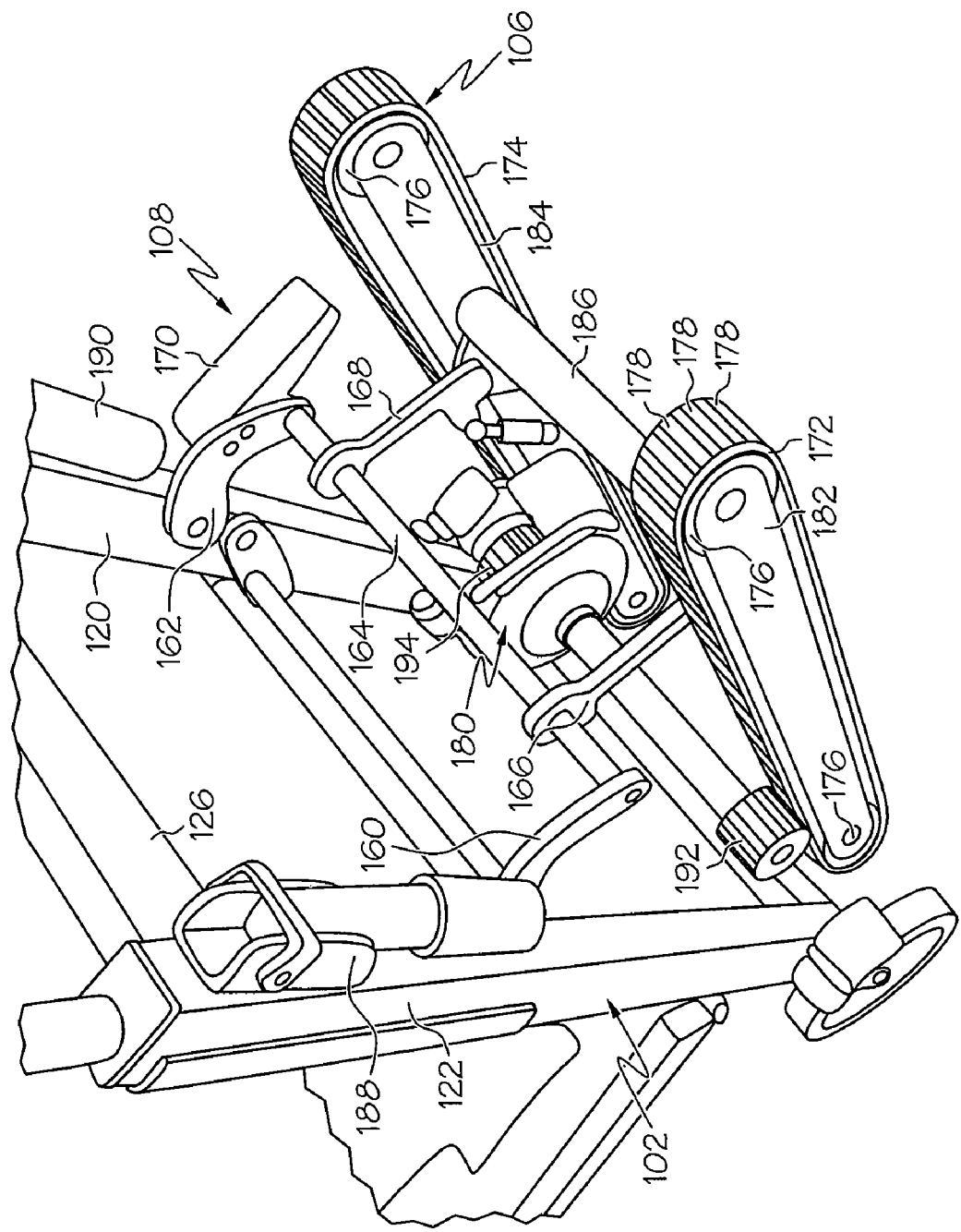
FIG. 4 is a closer rearward perspective view of a stair chair embodiment showing rail assemblies of the chair in an open position with an adjustable glide track resistance and braking device according to the present invention.

With reference first to FIGS. 1-4, a collapsible stair chair 100, generally comprising a main frame 102, a seating assembly 104, a glide track assembly 106, and a latching assembly 108, is illustrated. Generally, the main frame 102 provides a base or frame for the other components of the chair 100, and supports the chair for movement over floors and other flat surfaces. Seating assembly 104 is provided to form a seat for a person, and is mounted pivotally at a rear end to the main frame 102. The glide track assembly 106 is also mounted pivotally to the main frame 102 and provides support to the chair 100 for movement down stairs. The latching assembly 108, which is best shown by FIG. 4, is connected pivotally to and supported between the main frame 102 and the glide track assembly 106.

The stair chair 100 further includes extendable handles 110 and 111, a back section 112, a front support assembly 114, and a harness system 116 having upper torso, lower torso, and leg restraints (upper and lower torso restraints removed for ease of illustration). The extendable handles 110 and 111 may be located releasably in one of a variety of positions outward from the stair chair 100 in order to provide an operator the best control and leverage advantage when transitioning the stair chair along a set of stairs. The back section 112 provides direct support for the upper back of a person seated in the stair chair 100. The front support assembly 114 provides additional support to the front of stair chair 100, and is mounted pivotally to a front end of the seating assembly 104. The harness system 116 is used to hold a person in the stair chair 100. A foldable footrest 118 is also provided for the comfort of the person seated on the stair chair 100.

Figure 1:
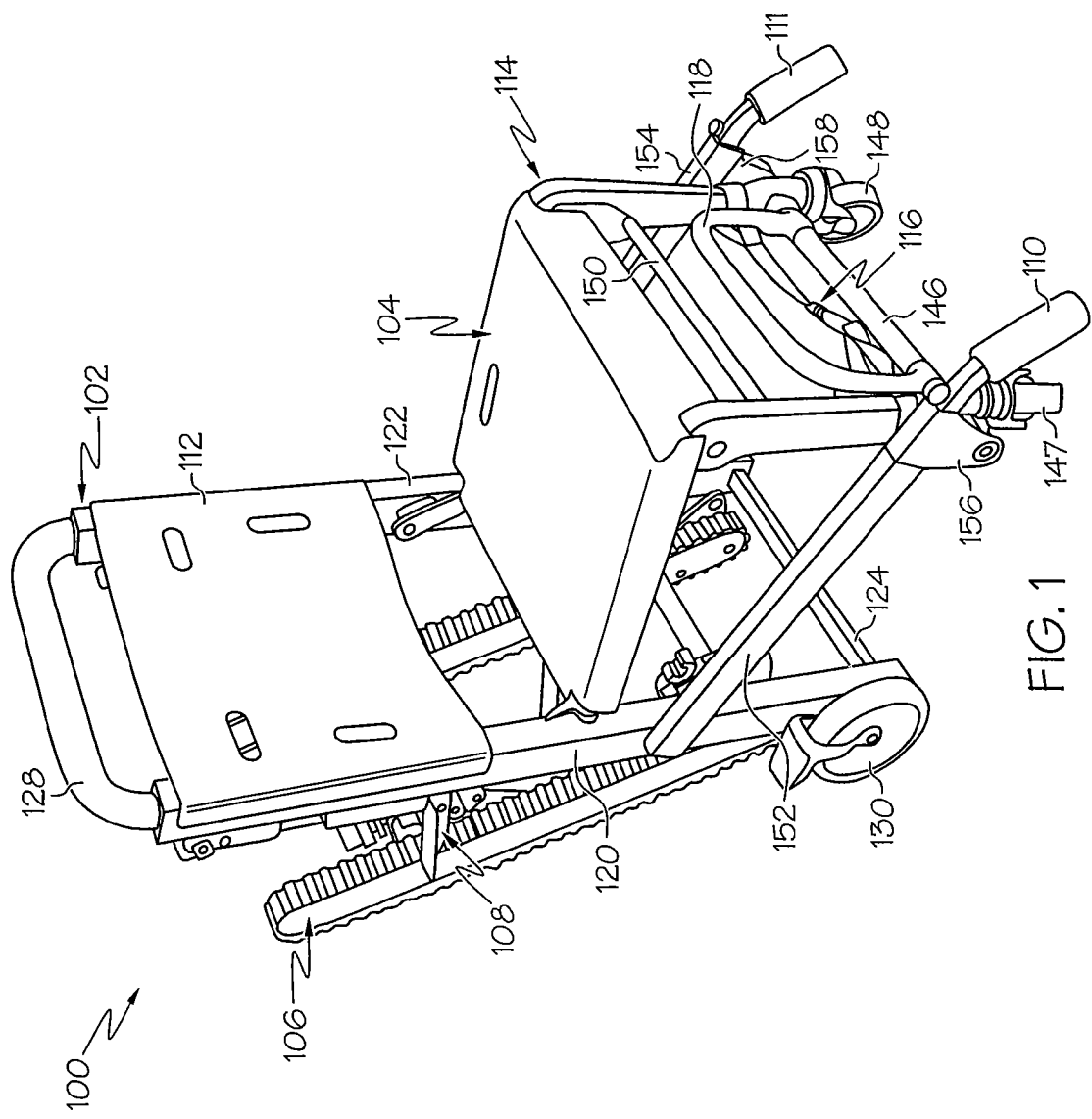
FIG. 1 is a front elevated perspective view of a collapsible stair chair embodying the present invention.

The elements and components of stair chair 100 are connected together so that the stair chair can be expanded from a collapsed form, shown in FIG. 2, to an open form, shown in FIGS. 1, 3 and 4. In its collapsed position, the stair chair 100 has a small, compact size and shape and, for example, the stair chair can be stored in a vehicle or closet without occupying a substantial amount of space. When the stair chair 100 is opened, a person can be safely and securely seated and transported in the stair chair; and in particular, a person in the stair chair can be easily transported up and down a set of stairs.

With the embodiments of stair chair 100 shown in FIGS. 1-4, main frame 102 includes left and right support members 120 and 122, lower cross member 124, upper cross member 126 (best shown by FIG. 3), and a height adjustable, u-shaped handle bar 128. The handle bar 128 is accommodated slidably in respective cavities of the left and right support members 120 and 122, and may be located releasably in one of a variety of positions which provides an operator the best control and leverage advantage when transitioning the stair chair 100 along the stairs or a surface. At lower ends of the right and left support members 120 and 122 are provided wheels 130 and 131 mounted rotatably on the main frame to support the stair chair 100 for movement over the surface.

Left and right support members 120 and 122 of main frame 102 are generally parallel to each other and generally define the left and right sides of stair chair 100. Lower cross member 124 is connected to and extends between lower ends of the support members 120 and 122. The upper cross member 126 of the main frame is connected to and extends between upper ends of the support members 120 and 122. Wheels 130 and 131 are connected to bottom ends of the support member 120 and 122 via suitable brackets. With these connections, frame members 120, 122, 124 and 126 form a sturdy rectangular shaped support frame for the stair chair 100.

As best shown by FIG. 2, seating assembly 104 includes four support members 132, 134, 136, and 138, which together form a rectangular frame. The front support member 132 mounts pivotally the front support assembly 114. The four support members 132, 134, 136, and 138 together releasably support a polymer based seat 140. The seat 140 may be conveniently removed for cleaning. The front support assembly 114 includes legs 142 and 144, and a leg cross member 146 connected to and extending between the legs 142 and 144. The foldable footrest 118 is pivotally mounted to the leg cross member 146. At the lower ends of the legs 142 and 144 are wheels 147 and 148. Wheels 147 and 148 in one embodiment are swivel castors such that the stair chair 100 may be conveniently moved about a surface. A lock release 150 is provided such that the front support assembly 114 may be released from its extended position shown in FIG. 1, and situated in its folded position shown by FIG. 2.

Seating assembly 104 is pivotally connected to main frame 102 for pivotal movement between a closed or folded position and an open or unfolded position. In the closed position, as shown in FIG. 2, the side support members 136 and 138 of the seating assembly 104 extend generally parallel and closely adjacent to main frame 102. In the unfolded position, the side support 136 and 138 of the seating assembly 104 extend away from the main frame 102, generally perpendicular thereto, as shown in FIG. 1.

The extendable handles 110 and 111 are each accommodated slidably within a respective handle frame member 152 and 154, which is best shown by FIG. 1. The handle frame members 152 and 154 are pivotally connected at one end to the main frame 102, and pivotally connected at their front end by the front support assembly 114 via respective brackets 156 and 158. By this arrangement, the frame members 152 and 154 may transition automatically from their position in FIG. 1, and rotated in parallel with the main frame 102 for compact storage of the stair chair 100, as shown in FIG. 2.

With particular reference to FIGS. 3 and 4, the glide track assembly 106 is also pivotally connected at lower ends, via a pair of brackets 300 and 302, to main frame 102 of stair chair 100 for pivotal movement between folded or closed and unfolded or open positions. In the folded or closed position, shown in FIG. 3, the glide track assembly 106 extends upward from a lower portion of main frame 102, generally parallel thereto; and in the unfolded or open position, shown in FIGS. 1, 4, and 5, the glide track assembly 106 extends upward and away from the main frame 102.

The glide track assembly 106 is also pivotally connected at an upper portion to latching assembly 108. As shown, the latching assembly 108 is pivotally connected to and supported between the main frame 102 and the glide track assembly 106. The latching assembly 108 has a retracted position, as shown in FIG. 3, which releasably holds the glide track assembly 106 in the closed position, and an extended position, shown in FIG. 4, which releasably holds the glide track assembly 106 in the open position.

As best shown by FIG. 4, the latching assembly 108 has a first pair of arms 160 and 162 pivotally connected at first ends thereof to the main frame 102. A crossbar 164 is mounted between the first pair of arms 160 and 162 at second ends thereof. The crossbar 164 supports a second pair of arms 166 and 168. In one embodiment, the second pair of arms 166 and 168 are pivotally connected to the crossbar 164 and the glide track assembly 106. In a second embodiment, the second pair of arms 166 and 168 are statically mounted to the crossbar 164 and pivotally mounted to the glide track assembly 106, wherein the crossbar 164 is pivotally mounted between the first pair of arms 160 and 162. The first pair of arms 160 and 162 each have a bent portion, which directs the arms 160 and 162 downwards in the extended position as shown in FIG. 4. It is to be appreciated that the physical shape of the first pair of arms 160 and 162, which situates the crossbar 164 and the second pair of arms 166 and 168 in the illustrated extended position, secures the glide track assembly 106 in the open position. A lever 170 of the latching assembly 108, which is mounted to one of the first pairs of arms, such as arm 162, permits an operator to conveniently pivot and lock the glide track assembly 106 between its closed and open positions depending on the need by moving the latching assembly 108 between a retraced position, shown in FIG. 3, and the extended position, shown in FIG. 4, respectively.

Figure 5:
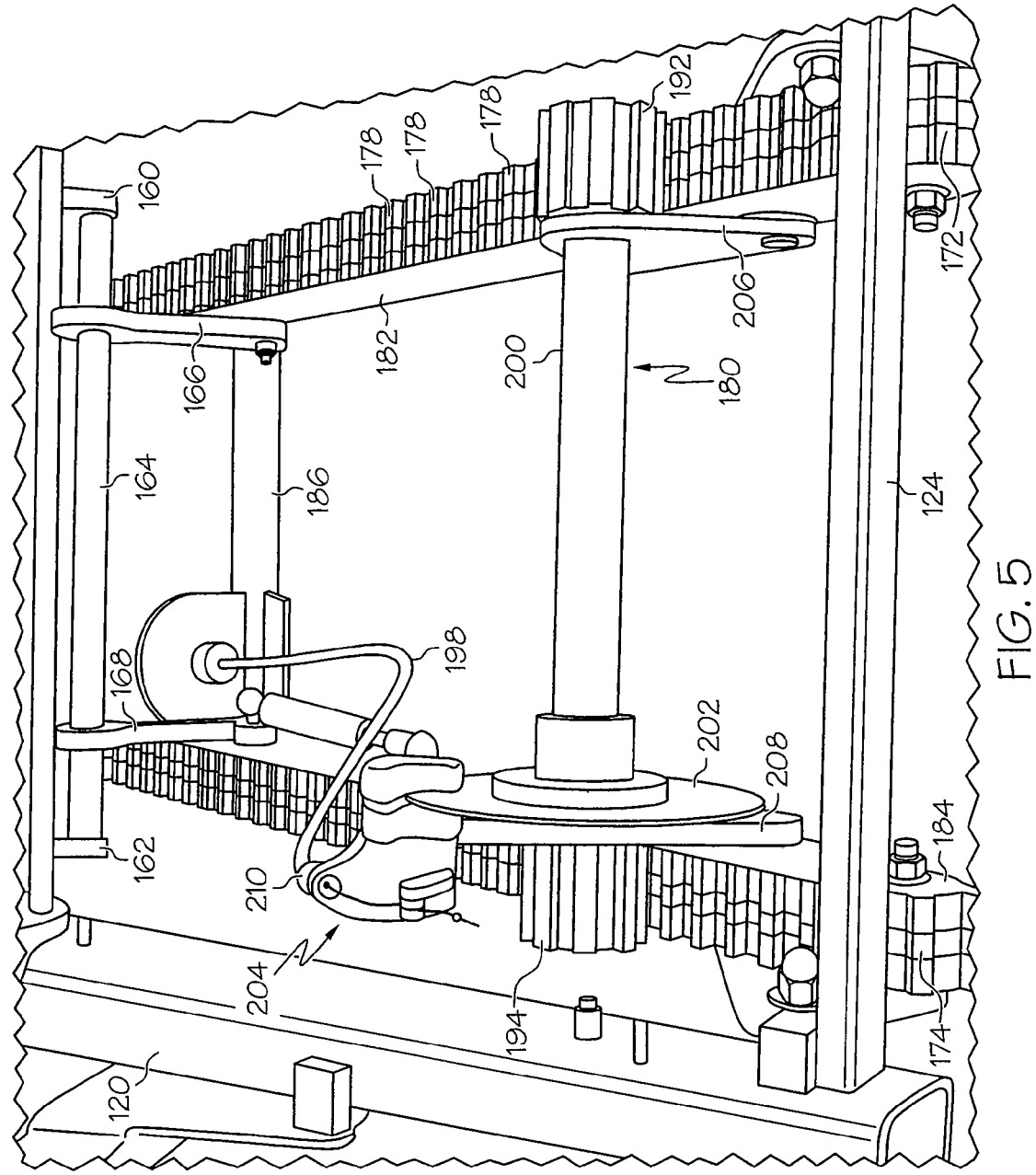
FIG. 5 is an enlarged view of an adjustable glide track resistance and braking device according to the present invention.

With reference now made to FIGS. 3, 4 and 5, the glide track assembly 106 includes a pair of endless glide tracks 172 and 174, each supported rotatably by rollers 176. Each of the glide tracks 172 and 174 has a tread or teeth 178 provided on an exterior surface thereof. The teeth 178 serves both to provide a gripping surface of the stair chair 100 in contact with the stairs to prevent slipping, and as an engagement member for an adjustable glide track resistance and braking device 180 according to the present invention, which is explained in greater detail in a later section hereinafter. The rollers 176 supporting the endless glide tracks 172 and 174 are rotatably mounted a respective rail 182 and 184 at least at the ends thereof. In addition, the rollers 176 are arranged in a linear sequence or path on their respective rails 182 and 184 such that each respective endless glide track 172 and 174 rotates endlessly around a path defined by their respective rollers 176.

The glide track assembly 106 further includes a rail cross member 186 mounted between the rails 182 and 184 at an upper portion thereof. At lower ends thereof, the rails 182 and 184 are pivotally mounted to the lower portion of the main frame 102 to a respective support member 120 and 122. It is to be appreciated that the rails 182 and 184 are mounted in such a fashion that the glide tracks 172 and 174 do not engage the surface upon which the stair chair 100 is rolling about upon wheels 130 and 148. The main frame 102 also includes a pair of hand grips 188 and 190 that are releasably positionable in folded and unfolded positions, which may be conveniently used by the operator to maneuver the stair char 100 around the surface.

The adjustable glide track resistance and braking device 180 (herein after referred to as "the braking device 180", and best shown by FIG. 5), has a pair of gears 192 and 194 which each engage a respective one of the endless glide tracks 172 and 174. In particular, each of the gears 192 and 194 meshes with the teeth 178 of their respective endless glide tracks 172 and 174. In one embodiment, the braking device 180 is configured to arrest movement of the endless glide tracks 172 and 174 when operated via an actuator 196 connected thereto, which in the illustrated embodiment of FIG. 3, is a hand lever, but other actuators such as buttons, pulls, etc., may be suitably used.

In the illustrated embodiment, the actuator 196 is conveniently located on the extendable handle 128 for use by the operator when transiting the stair chair 100 on the stairs. In still another embodiment, the actuator 196 may be situated adjacent one of the extendable handles 110, if so desired. The actuator 196 is connected to the braking device 180 via line 198. It is to be appreciated that line 198 may be a cable or tubing depending on the type of braking device 180 used, either mechanical or hydraulic. In the hydraulic embodiment, the actuator 196 would include master cylinder components (not shown) which provide hydraulic fluid to a hydraulically actuated caliper (not shown) in a disc brake 204, via line 198. In the mechanical embodiment, line 198 is a cable attached between the actuator 196 and a mechanically actuated caliper (not shown) of the disc brake 204. As disc brake 204 (both mechanically and hydraulically based) is conventional, not further discussion is provided.

As best shown by FIG. 5, the gears 192 and 194 are joined together via an axle 200. The axle 200 also mounts a rotor 202, such that the gears 192 and 194 and rotor 202 rotate with the axle 200. The rotor 202 is part of the disc brake 204, which is mounted to one of a pair of brackets 206 and 208, which are each mounted to a respective one of the rails 182 and 184. Due to the engagement of the gears 192 and 194 to glide tracks 172 and 174, via meshing with teeth 178, any rotating resistance applied to rotor 204 by the disc brake 204 will similarly affect the rolling of the endless glide tracks 172 and 174.

Using the actuator 196 in an operated position, i.e., squeezing the actuator will move brake pads (not shown) of the disc brake 204 into fuller engagement with the rotor 202 to provide variable rolling resistance. Fully squeezing the actuator 196 will arrest rotation of the disc 202, and thus similarly stop the movement of the glide tracks 172 and 174, and hence stop the movement of the stair chair 100 along a set of stairs, if desired. A preset rolling resistance may be applied to the endless glide tracks 172 and 174 and infinitely adjusted between 0 to 100% resistance via a preset adjustor 210. In one embodiment, finer adjustments to the preset rolling resistance may be further made via a fine adjuster 212, which functions the same as adjuster 210, except makes smaller adjustments to the rolling resistance when turned. Adjusting either adjustor 210 or 212 will adjust the engagement of the brake pads (not shown) of the disc brake 204 with the rotor 202 to provide the preset rolling resistance. Further rolling resistance, in addition to the preset rolling resistance, is applied via operating the actuator 196.

Figure 6:
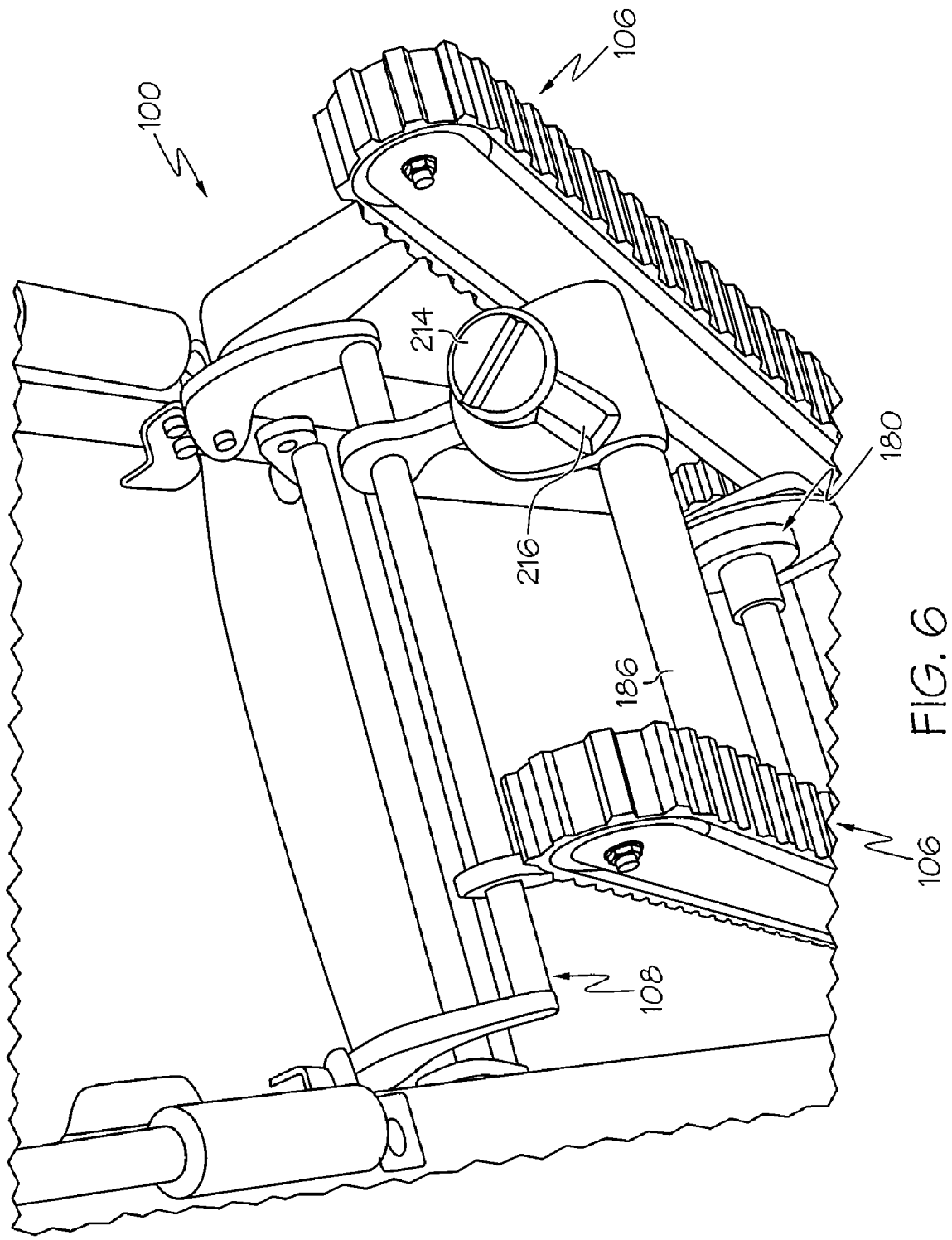
FIG. 6 is a rearward, elevated perspective view of another embodiment of a stair chair with a glide track assembly in an open or deployed position with an adjustable glide track resistance and braking device according to the present invention having a control knob used to adjust rolling resistance.

In another embodiment illustrated by FIG. 6, the braking device 180 is configured to infinitely adjust the amount of resistance applied to the pair of endless glide tracks between 0 to 100% resistance and to set a desired rolling resistance applied to the pair of endless glide tracks from 0 to 100% resistance. It is to be appreciated that a 100% resistance, as with the hand actuator 196 (FIG. 3) being fully operated, prevents rotation of the glide tracks 172 and 174. In this alternative embodiment, the rolling resistance is set via a control, such as control knob 214. The control knob 214 is provided in this embodiment on the guide track assembly 106, and in particular mounted to the crossbar 186, for convenient access by an operator. The control knob 214 is used by an operator to infinitely set the desired rolling resistance anywhere between 0 to 100% resistance that is applied to the glide track assembly 106. For example, the control knob 214 provides in one embodiment, a 270° adjustment (turning) range, wherein adjusting the control knob clockwise (up to about 135°) reduces the rolling resistance from a preset rolling resistance, and adjusting the control knob counterclockwise (up to 135°) increases the rolling resistance from the preset resistance. In other embodiments, other suitable adjustment methods may be used, such as for example, as sliding lever, thumb wheels, etc. A lock 216 is also provided to the control knob 214 to lock a selected resistance setting into place. The present rolling resistance is set and adjusted in this embodiment via the adjustor 210 of the disc brake 204.

Although the operation of chair 100 is apparent from a review of the above discussion, that operation will now be summarized. This operation is specifically illustrated in FIGS. 1-4, and as shown therein, one of the advantages of the present invention is that the stair chair can readily and easily be used to transport people both upstairs and downstairs in a controlled fashion via use of the adjustable glide track resistance and braking device 180. In addition, as shown in FIG. 2, the stair chair 100 may be stored in its compact, collapsed position, and the chair may be fully opened, as shown in FIG. 1 by means of a simple procedure. To open the chair, seating assembly 104 is pulled into its open position and locked. When seating assembly 104 is pulled into its opened position, front support assembly 114 and handle frame member 152 and 154 are automatically moved into their open or operating positions. The footrest 118 may be extended to support the feet of a person thereon, if desired.

Once stair chair 100 is opened, a person may be seated in the chair. Then belt sections of the harness system 116 may be connected together across the chest, lap, and legs of that person. When the stair chair 100 is moved over a flat, or comparatively flat, surface, the stair chair is supported by wheels 130, 131, 147, 148, and may be controlled by extending the handgrips 188 and 190, and/or via the handlebar 128. When the stair chair 100 is transitioning along stairs, the stair chair is supported by the lateral glide tracks assembly 106, which engages and extends across the top edges of the stairs.

The extendable handles 110 and 111 may be locked in an extended position to provide better leverage and control. Two people then transition the stair chair 100 along stairs in a controlled fashion, wherein one of the operators may control the rolling speed and braking of chair via actuator 196 in one embodiment. In another embodiment of the stair chair 100, rolling speed of the tracks 172 and 174 may be set via control knob 214 as well as the preset rolling resistance via adjustor 210, or in the previous embodiment having the actuator 196, via fine adjuster 212, before transiting along the stairs.

It will be appreciated that numerous modifications and embodiments may be devised by those skilled in the art, and it is intended that the appended claims cover all such modifications and embodiments as fall within the true spirit and scope of the present invention.

What is claimed is:

1. A stair chair for transporting a person up and down a flight of stairs and over a ground surface, said stair chair comprising:
   a main frame;
   a glide track assembly to support the stair chair for movement on the stairs, and pivotally connected to the main frame for pivotal movement between open and closed positions, said glide track assembly having at least one endless glide track, wherein said at least one glide track comprises teeth; and
   an adjustable glide track resistance and braking device engaging said at least one endless glide track, said device is configured to infinitely adjust an amount of resistance applied to said endless glide track between 0 to 100% resistance and to set a desired rolling resistance applied to said endless glide track, wherein said adjustable glide track resistance and braking device comprises at least one gear which meshes with said teeth of said at least one glide track.

2. A stair chair according to claim 1, further comprising an actuator connected to said adjustable glide track resistance and braking device to arrest movement of said endless glide track when operated via said actuator.

3. A stair chair according to claim 1, wherein said adjustable glide track resistance and braking device comprises a disc brake.

4. A stair chair according to claim 1, wherein said at least one glide track comprises teeth provided on an exterior surface and wherein said adjustable glide track resistance and braking device comprises at least one gear which meshes with said teeth.

5. A stair chair according to claim 1, wherein said at least one glide track comprises teeth and wherein said adjustable glide track resistance and braking device comprises at least one gear which meshes with said teeth, and a disc brake connected to said at least one gear.

6. A stair chair according to claim 1, wherein said at least one glide track comprises teeth and wherein said adjustable glide track resistance and braking device comprises at least one gear which meshes with said teeth, and a disc brake comprising a rotor which is connected to the at least one gear via an axle.

7. A stair chair according to claim 1, wherein said at least one glide track comprises teeth and wherein said adjustable glide track resistance and braking device comprises at least one gear which meshes with said teeth, and a disc brake comprising a rotor which is connected to said at least one gear via an axle, and an adjustor which adjusts and sets said desired rolling resistance applied to said endless glide track via adjusting a pressure applied to said rotor.

8. A stair chair according to claim 1, wherein said stair chair is collapsible into a reduced profile for convenient storage.

9. A stair chair for transporting a person up and down a flight of stairs and over a ground surface, said stair chair comprising:
a main frame;
a seating assembly pivotally connected to the main frame for pivotal movement between open and closed positions;
a pair of wheels rotatable mounted on the main frame to support the chair for movement over a surface;
a glide track assembly to support the stair chair for movement on the stairs, and pivotally connected to the main frame for pivotal movement between open and closed positions, said glide track assembly having a pair of endless glide tracks, wherein said glide tracks have teeth;
a latching assembly pivotally connected to and supported between the main frame and the glide track assembly, the latching assembly has a retracted position which releasably holds said glide track assembly in the closed position, and an extended position which releasably holds said glide track assembly in the open position; and
an adjustable glide track resistance and braking device engaging said pair of endless glide tracks, said device is configured to infinitely adjust an amount of resistance applied to said pair of endless glide tracks between 0 to 100% resistance and to set a desired rolling resistance applied to said pair of endless glide tracks, and configured to arrest movement of said endless glide tracks when operated via an actuator connected thereto, wherein said adjustable glide track resistance and braking device comprises gears which mesh with said teeth of said glide tracks.

10. A stair chair according to claim 9, wherein the main frame includes left and right support members, a cross member supported by and positioned between the left and right support members, and an height adjustable handle bar slidably accommodated in respective cavities of said left and right support members.

11. A stair chair according to claim 9, wherein the main frame includes left and right support members, a cross member supported by and positioned between the left and right support members; a pair of hand grips releasably positionable in folded and unfolded positions; and an height adjustable handle bar slidably accommodated in respective cavities of said left and right support members.

12. A stair chair according to claim 9, wherein the seating assembly includes a seat, a pair of legs pivotally connected to the seat, and wheels rotatably and pivotably mounted to said legs to support the stair chair for movement over the ground surface when said seat assembly is in said open position which permits the person to sit upon said seat.

13. A stair chair according to claim 9, wherein said pair of endless glide tracks are supported by a plurality of rollers.

14. A stair chair according to claim 9, wherein said pair of endless glide tracks have a patterned exterior surface.

15. A collapsible chair according to claim 9, wherein said latching assembly comprises a first pair of arms pivotably connected to said main frame, a crossbar mounted between said first pair of arms, a second pair of arms pivotally connected to said crossbar and said glide track assembly, and a lever mounted to one of said arms for placing said glide track assembly in the closed and open positions.

16. A stair chair according to claim 9, further comprising an actuator connected to said adjustable glide track resistance and braking device to arrest movement of said endless glide tracks when operated via said actuator.

17. A stair chair according to claim 9, wherein said adjustable glide track resistance and braking device comprises a disc brake.

18. A stair chair according to claim 9, wherein said glide tracks have teeth provided on an exterior surface and wherein said adjustable glide track resistance and braking device comprises gears which meshes with said teeth.

19. A stair chair according to claim 9, wherein said glide tracks have teeth and wherein said adjustable glide track resistance and braking device comprises gears which mesh with said teeth, and a disc brake connected to said gears.

20. A stair chair according to claim 9, wherein said glide tracks have teeth and wherein said adjustable glide track resistance and braking device comprises gears which mesh with said teeth, and a disc brake comprising a caliper, a pair of brake pads, and a rotor which is connected to the gears via an axle, said rotor is engageable by said pair of brake pads via movement of said caliper.

21. A stair chair according to claim 9, wherein said glide tracks have teeth and wherein said adjustable glide track resistance and braking device comprises gears which mesh with said teeth, and a disc brake comprising a caliper having a piston and a pair of brake pads, a rotor which is connected to the gears via an axle, said rotor is engageable by said pair of brake pads via movement of said piston, and an adjustor which adjusts and sets said desired rolling resistance applied to said endless glide tracks via moving said piston from a first location to a second location which adjusts a pressure that at least one of said brake pads applies to said rotor.

22. A stair chair according to claim 9, wherein said stair chair is collapsible into a reduced profile for convenient storage.

23. A stair chair according to claim 9, wherein said adjustable glide track resistance and braking device comprises a mechanical disc brake.

24. A stair chair according to claim 9, wherein said adjustable glide track resistance and braking device comprises a hydraulic disc brake.

25. A stair chair for transporting a person up and down a flight of stairs and over a ground surface, said stair chair comprising:
- a main frame having left and right support members, a cross member supported by and positioned between the left and right support members, a pair of hand grips releasably positionable in folded and unfolded positions, an height adjustable handle bar slidably accommodated in respective cavities of said left and right support members, and a pair of wheels to support the chair for movement over a surface;
- a seating assembly pivotally connected to the main frame for pivotal movement between open and closed positions, the seating assembly includes a seat, a pair of legs pivotally connected to the seat, and wheels rotatably and pivotably mounted to said legs to support the stair chair for movement over the ground surface when said seat assembly is in said open position which permits the person to sit upon said seat;
- a glide track assembly to support the stair chair for movement on the stairs, and pivotally connected to the main frame for pivotal movement between open and closed positions, said glide track assembly having endless glide tracks;
- a latching assembly pivotally connected to and supported between the main frame and the glide track assembly, the latching assembly has a retracted position which releasably holds said glide track assembly in the closed position, and an extended position which releasably holds said glide track assembly in the open position, said latching assembly comprises a first pair of arms pivotably connected to said main frame, a crossbar mounted between said first pair of arms, a second pair of arms pivotably connected to said crossbar and said glide track assembly, and a lever mounted to one of said arms for placing said glide track assembly in the closed and open positions; and
- an adjustable glide track resistance and braking device engaging said pair of endless glide tracks, said device is configured to infinitely adjust an amount of resistance applied to said endless glide tracks between 0 to 100% resistance and to set a desired rolling resistance applied to said endless glide tracks, and configured to arrest movement of said endless glide tracks when operated via an actuator connected thereto, wherein said glide tracks have teeth and wherein said adjustable glide track resistance and braking device comprises gears which mesh with said teeth, and a disc brake comprising a rotor which is connected to the gears via an axle, and an adjustor which adjusts and sets said desired rolling resistance applied to said endless glide tracks via adjusting a pressure that is applied to said rotor.

\* \* \* \* \*